United States Patent [19]
Alper

[11] 3,821,375
[45] June 28, 1974

[54] TREATMENT OF OTITIS OF DOGS AND CATS WITH CHLORAMPHENICOL-SQUALANE COMPOSITION

[76] Inventor: Conrad H. Alper, 26 Dell Dr., E. Rockaway, N.Y. 11518

[22] Filed: June 2, 1972

[21] Appl. No.: 259,346

Related U.S. Application Data

[63] Continuation of Ser. No. 87,286, Nov. 5, 1970, abandoned, and a continuation-in-part of Ser. No. 843,188, June 18, 1969, abandoned.

[52] U.S. Cl................ 424/240, 424/324, 424/355
[51] Int. Cl...................... A61k 17/00, A61k 27/00
[58] Field of Search.................... 424/240, 324, 355

[56] References Cited
UNITED STATES PATENTS
3,337,400　8/1967　Smith................................ 424/240

OTHER PUBLICATIONS

Modern Drug Encyclopedia–7th edit. (1958), page 233, 234 & 914.

The Merck Veterinary Manual–2nd Ed. (1961). pp. 522, 523, 628 and 629.

Vet. Drug Encyclopedia & Ther. Index–12th ed. (1964), pg. 130.

Merck Index–7th ed. (1960), page 974.

*Primary Examiner*—Sam Rosen

[57] ABSTRACT

Treatment of otitis in dogs and cats with a suspension, in a hydrocarbon base, of dispersed chloramphenicol and prednisolone together with dissolved tetracaine and squalane.

14 Claims, No Drawings

TREATMENT OF OTITIS OF DOGS AND CATS WITH CHLORAMPHENICOL-SQUALANE COMPOSITION

This application is a continuation of application Ser. No. 87,286 filed Nov. 5, 1970 and a continuation-in-part of application Ser. No. 843,188 filed June 18, 1969, both now abandoned.

The invention relates to compositions for the treatment of otitis (inflammation and infection of the ear), particularly suitable for veterinary use, especially for dogs and cats.

Compositions for the veterinary treatment of otitis are well known in the art. For instance there are, or have been, on the market for this purpose such compositions as: an aqueous solution of chloramphenicol; an ointment containing triamcinolone, neomycin, thiostrepton and nystatin; an ointment containing prednisolone, neomycin and tetracaine; an ointment containing zinc oxide, resorcinol, calamine and oil of cade; and compositions containing sulfa drugs such as sulfathiazole or sulfanilamide in solution.

In accordance with one aspect of this invention there is prepared a composition containing chloramphenicol and squalane. Preferably the composition is a relatively fluid suspension, in a hydrocarbon base, of dispersed prednisolone and chloramphenicol together with dissolved tetracaine (which is a local anesthetic) and squalane. This product has been found to give outstanding results in the treatment of acute otitis and chronic otitis. For instance it has been found that treatment of chronic recurring otitis in dogs and cats with the compositions of this invention (after the animal had been treated, without success, with other commercially available drug products for this purpose) gave marked and dramatic recovery (with few recurrences, which took place 6 months to a year later).

This invention is illustrated by the following Example. In the Example, as in the rest of the application, all proportions are by weight unless otherwise indicated.

EXAMPLE

There is prepared a blend of a hydrocarbon base with, for each ml of composition, 4.2 mg chloramphenicol (USP), 1.7 mg prednisolone (USP), 4.2 mg tetracaine (USP), and 0.21 ml squalane. In preparing the blend, white petrolatum USP is mixed with the foregoing named ingredients, the amount of the white petrolatum being 300 mg per ml of final composition; sufficient mineral oil ("liquid petrolatum NF") is added to give the specified final volume; the proportion of the white petrolatum by weight is generally some 30–40 percent of the composition while the proportion of mineral oil is about 40–50 percent. The whole composition is passed through a colloid mill having its relatively moving elements very closely spaced (e.g., a 0.004 inch clearance) to give a mixture in which all the individual suspended particles are reduced to micron size (e.g., below 50 microns) impalpable powder. Prior to its addition to the petrolatum the prednisolone is passed through a micronizer to reduce its particle size to, say, below 50 microns.

The composition is relatively viscous but thin enough to be applied to the affected area as droplets from a conventional ear dropper. The composition has excellent storage stability. For best results it should be shaken before using, to insure uniform distribution of the suspended impalpable solids.

In typical cases of otitis in which the ear is plugged with caked ceruminous material and there is a suppurative exudate from the ear canal, which has a fiery red inflamed appearance, the treatment with the composition of this invention (e.g., 2 to 3 applications daily, such as with about 10 to 20 drops per day) has given substantially complete reduction in the inflammation and freedom from pus and caked material in some 24 to 36 hours (for acute otitis) and 48–72 hours (for chronic otitis).

The relative amounts and concentrations may be varied. For instance, the concentration of chloramphenicol in the mixture may be in the range of about 0.3 to 1 percent, the concentration of prednisolone may be in the range of about 0.1 to 0.3 percent, the concentration of tetracaine may be in the range of about 0.3 to 1 percent, and the concentration of squalane may be in the range of about 10 or 15 percent to 30 percent. It is believed that the squalane speeds up percutaneous penetration, both transfollicular as well as transepidermal, allowing for accelerated penetration of the active ingredients through the horny layer; it is miscible with sebum and epidermal lipids facilitating removal of accumulated ear wax and dirt and permits direct contact between the active ingredients and the affected area. The composition may also be in the form of an ointment rather than a suspension; this may be effected by raising the ratio of petrolatum to mineral oil in the base to increase the consistency of the mixture.

It is also within the broader scope of the invention to use other antiinflammatory steroids (e.g. hydrocortisone or prednisone) in place of all or part of the prednisolone and to use other local anesthetics (e.g., lidocaine or benzocaine) in place of all or part of the tetracaine. It is also within the broader scope of the invention, but less effective, to omit either the steroid or anesthetic or both.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

I claim:

1. A process for treating otitis of domesticated animals by applying to their ears a composition containing an effective amount of chloroamphenicol in admixture with squalane, the amount of squalane being at least about 10% of the applied composition and sufficient to increase the effectiveness of the composition.

2. A process as in claim 1 in which the composition contains an effective amount of prednisolone as an antiinflammatory agent and an effective amount of tetracaine as a local anesthetic.

3. Process as in claim 2 in which said composition is a flowable droplet-forming suspension containing impalpable finely divided solid chloramphenicol and prednisolone in a liquid which is a uniform mixture of tetracaine, squalane and a hydrocarbon base.

4. Process as in claim 1 in which the composition contains about 0.3 to 1 percent chloramphenicol, about 0.1 to 0.3 percent prednisolone, about 0.3 to 1 percent tetracaine and about 10 to 30 percent squalane.

5. Process as in claim 1 in which said chloramphenicol is present as a dispersed impalpable finely divided solid in a petrolatum base containing squalane, the proportion of squalane being about 10 to 30 percent of the composition.

6. A composition for treating otitis in domestic animals containing an effective amount of chloramphenicol and also containing squalane, the proportion of squalane being at least about 10 percent and sufficient to increase the effectiveness of the composition.

7. A composition as in claim 6 containing about 0.3 to 1 percent chloramphenicol, about 0.1 to 0.3 percent prednisolone, about 0.3 to 1 percent tetracaine and about 10 to 30 percent squalane.

8. A composition as in claim 7, in an aliphatic hydrocarbon base.

9. Composition as in claim 8 in which said composition is a flowable droplet-forming suspension containing impalpable finely divided solid chloramphenicol and prednisolone in a liquid which is a uniform mixture of tetracaine, squalane and a petrolatum base.

10. A composition as in claim 6 which contains an effective amount of prednisolone, hydrocortisone or prednisone as an antiinflammatory agent and an effective amount of tetracaine, lidocaine or benzocaine as a local anesthetic.

11. A composition as in claim 6 in which said chloramphenicol is present as a dispersed impalpable finely divided solid in a petrolatum base containing squalane, the proportion of squalane being about 10 to 30 percent of the composition.

12. A composition as in claim 10 containing prednisolone and tetracaine.

13. Process as in claim 2 in which said composition contains, per milliliter, 4.2. mg chloramphenicol, 1.7 mg prednisolone, 4.2 mg tetracaine, 0.21 ml squalane and 300 mg white petrolatum, the balance being liquid petrolatum, said composition being a suspension of impalpable solid particles.

14. Composition as in claim 12 said composition containing, per milliliter, 4.2 mg chloramphenicol, 1.7 mg prednisolone, 4.2 mg tetracaine, 0.21 ml squalane and 300 mg white petrolatum, the balance being liquid petrolatum, said composition being a suspension of impalpable solid particles.

* * * * *